GATING PULSE GENERATOR

Filed June 1, 1956 2 Sheets-Sheet 1

INVENTOR.
Howard P. Guerber & Bernard Adler
BY Morris Rabkin
ATTORNEY

INVENTORS
HOWARD P. GUERBER &
BERNARD ADLER
BY Morris L. Rabkin
ATTORNEY

United States Patent Office 2,948,884

Patented Aug. 9, 1960

2,948,884

GATING PULSE GENERATOR

Howard P. Guerber, Barrington, and Bernard Adler, Haddon Heights, N.J., assignors to Radio Corporation of America, a corporation of Delaware Filed June 1, 1956, Ser. No. 588,714

8 Claims. (Cl. 340—174)

This invention relates to systems for sensing informations signals, and more particularly to devices for generating gating pulses to control the flow of parallel information signals.

In modern data processing equipment, information in binary coded form may be supplied serially by character signals, each character signal comprising parallel (simultaneous) bit signals. A typical input source may be a moving web. The term web is intended to include a punched card, paper tape, magnetic tape, or photographic film, which may have physical representations of binary coded data.

A code character signal may be formed by the combination of the simultaneous occurrence of binary signals in parallel channels derived from the web. A mark may represent a binary "one" and a different mark, or the absence of a mark, may represent a binary "zero." The web need not carry timing reference marks or other means to synchronize the individual binary digits or bits of an information character. For example, reliance may be placed on the simultaneous passage of the component bit marks of each character past reading heads or other reading means to assure simultaneity of occurrence.

In the absence of a synchronizing source, transients or other effects may cause the component bits of a character to lose their simutaneity. Further, misalignment of the web in the reading device or maladjustment of the reading or writing heads may also cause a "skew" effect. The effect of skew often is to destroy the parallelism-in-time of the individual information bits. If messages are transferred directly from one medium to another, the skew effect may cumulate, especially if the rate of reading is high, and may cause the loss of any bits arriving too late to be read with the other bits of a character. Such losses give rise to incorrect character signals.

A circuit may be used in which a gating pulse is generated by the occurrence of a character signal combination having at least one bit, which gating pulse is then used to gate all of the bits of a character signal combination to the system simultaneously. Such a circuit is described in the copending application for patent, Serial No. 264,147, filed December 29, 1951, by Dallas R. Andrews entitled "Magnetic Pulse Recording," now U.S. Patent 2,760,063, issued August 21, 1956, and assigned to the assignee of the present invention. The Andrews circuit aids in overcoming skew effects for wide-pulse signals.

In using the first occurring bit to gate the character into the system, the location of the entire character in point of time is determined. The skew effect may cause the first bit to arrive at a time other than the nominal character arrival time. In systems using marks for binary "ones" and no mark for binary "zeros," characters represented by few bits or late occurring bits may appear delayed in the system, tending to "crowd" the characters immediately following.

An information handling system may be designed to accept character signals at a rate determined by the speed of the moving web and the spacing of individual characters. Nonuniformity in either of these factors may cause individual character signals to vary slightly from the predetermined nominal rate and thereby tend to appear either "early" or "late." In some data processing systems, a routine of operations establishes a desired minimum time interval between characters.

Accordingly, it is an object of the present invention to provide an improved means to correct the effects of misalignments and tape skew.

It is a further object of the invention to provide a means to gate all of the parallel bits of a binary code character into an information handling system simultaneously and with a character spacing not less than a predetermined value.

It is a still further object of the invention to provide an improved means for supplying an information handling system with asynchronous code signals.

It is an additional object of the invention to provide a means for correcting minor variations in character arrival rates and nevertheless present all of the parallel bits of each binary coded character signal to a data processing system.

Another object of this invention is to provide an improved means to correct for minor signal frequency variations and tape skew effects and to provide to an information handling system simultaneous signals representative of the parallel bits of a binary coded character.

The present invention may be considered an improvement over the circuit described in the copending application for patent filed by Howard P. Guerber on March 13, 1956, Serial No. 571,165, entitled "Signal Staticizer," now Patent 2,907,989, issued October 6, 1959, and assigned to the assignee of the present invention.

According to a preferred embodiment of the present invention, as exemplified in a system providing pulse signals representing binary "ones" and no pulse signals for binary zeroes, the incoming information signals are held in a staticizer of individual flip-flops. The first arriving "one" signal energizes a generating circuit that produces a gating impulse. The gating impulse is derived from the later occurring of two pulses. One pulse represents the first arriving "one" of a current incoming character combination. The other pulse represents the impulse that was generated to gate the immediately preceding character into the system.

The second occurring of these two pulses emerges from the generating circuit as a gating impulse and is delayed to allow time during which all component "one" signals of a character may be set up within the staticizer. The delayed gating impulse is applied to enable signal gates conditioned, or partially enabled, by the staticizing flip-flops holding binary "ones," thereby passing the complete character combination into the information handling system. After an additional delay, the gating impulse is applied to reset the system and is further applied to a delay circuit. The delay circuit holds each gating impulse for a character spacing interval so that the impulse may be the above mentioned other pulse to the generating circuit, applied concurrently with the arriving first "one" pulse.

The invention may be extended, for example, to a system in which binary "ones" are represented by a pulse signal of one polarity and binary "zeros" by a pulse signal of the opposite polarity.

The present invention may be more fully understood by reference to the following description when read in connection with the accompanying drawings in which.

Figure 1:
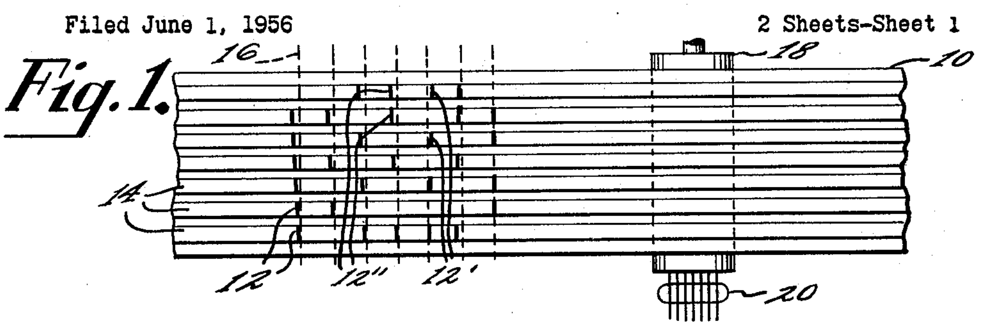
Figure 1 is a view of an information bearing web, for example, a magnetic tape having several information channels containing magnetized spots.

In Figure 1, coded information in the form of magnetized spots 12 representing binary "ones" is disposed on the surface of an information tape 10. Each character combination contains at least one spot 12 or binary "one." Similar information characters may be recorded as punched holes in paper tape, or exposed areas on photographic film. In Figure 1, the portion of a magnetic tape 10 shown has seven information carrying channels 14 in which the spots of magnetization 12 are placed in parallel columns 16. Each information character may consist of a particular binary combination of magnetized spots in one of the columns 16. As understood in the art, the column alignment need not be strictly geometrical, if the reading and writing equipment is designed to produce alignment of signals in the dimension of time. Thus the columns may be diagonally disposed parallel to each other and the reading heads similarly displaced diagonally.

As a result of tape skew or misalignment of one of a group of reading heads 18, the information "one" bits or spots 12 may appear out of parallel alignment to the reading heads 18 in that some information spots 12′ appear in advance of a column 16 and others 12″ lag a column 16. The columns 16 may be considered, for purposes of analysis, as geometrically aligned along lines perpendicular to the recording channels 14. However, whatever the geometrical configuration of the information spots 12 of a character, whether aligned or not, all of spots 12 of any single character are to be read at simultaneous instants of time in their respective channels 14.

"Skew" effects may also be observed if each of the parallel reading heads 18 is not aligned parallel to a corresponding recording head (not shown) relative to the direction of tape travel. Other skew effects might result from non-uniform electrical effects in different signal lines. Under these conditions, the information spots 12 of a column 16 in adjacent channels 14 appear as though they reached the reading heads 18 successively in time rather than simultaneously.

Figure 2:
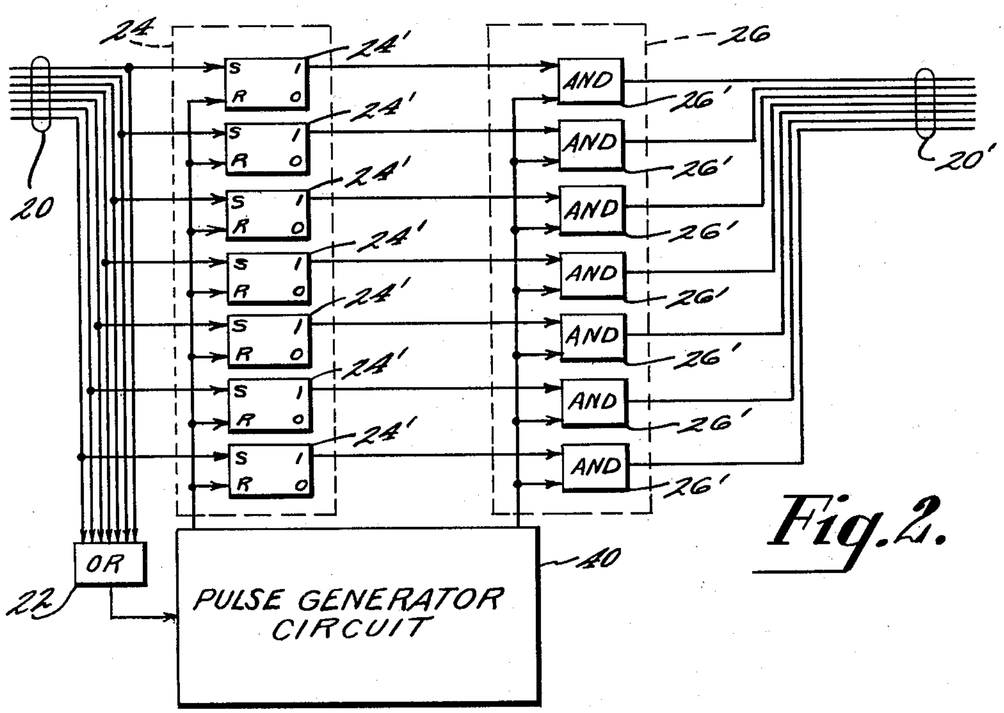
Figure 2 is a diagram of an information detector which may utilize a gating pulse generator according to the present invention.

The signals from the reading heads 18 are supplied to a detecting system over a multichannel cable 20 which connects to the circuit of Fig. 2. Each of the individual signals representing binary "ones" is transmitted along a different one of the lines of multichannel cable 20. The signals are applied to an "or" circuit 22 and to a register 24 of resettable storage means, such as individual staticizer flip-flops 24′, each receiving a different channel 14 signal at its set terminal S. The outputs of staticizer flip-flops 24′ are applied to the inputs of a set of signal "and" gates 26 made up of individual two-input "and" gates 26′, each corresponding to and connected to receive the "one" output of a different staticizer flip-flop 24′. A "one" output from a staticizer flip-flop 24′ partially enables the corresponding "and" gate 26′.

The "or" circuit 22 is a seven-input "or" circuit which provides an output on the occurrence of a "one" signal in any channel 14. The output of the "or" circuit 22 is applied to a gating pulse generator circuit 40, to be more fully described in connection with Figure 3. The generator circuit 40 supplies gating signals to the individual "and" gates 26′ and also reset signals to the individual staticizer flip-flops 24′. The outputs of the "and" gates 26′ are joined in a multichannel cable 20′ for use within the information handling system.

Figure 3:
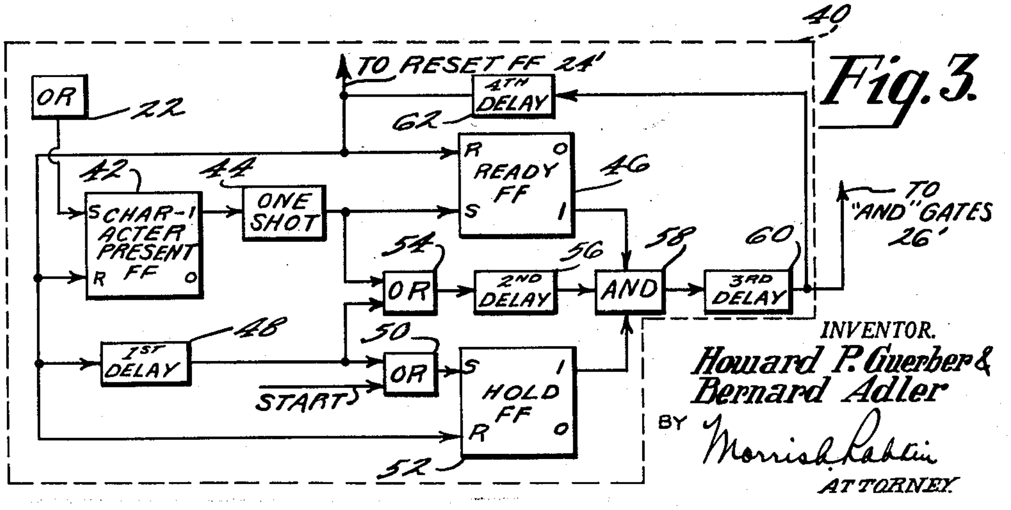
Figure 3 is a diagram of a gating pulse generating circuit according to the present invention which may provide gating and resetting impulses to the elements of Figure 2.

In Figure 3, enabling pulses for the "and" gates 26′ and reset signals for the staticizer flip-flops 24′ are produced in a gating pulse generating circuit 40. The output of the "or" circuit 22 is applied to the set terminal S of a "Character Present" flip-flop 42, the "one" output of which is applied to a monostable or "one-shot" multivibrator 44. The output of the one-shot 44 is applied to a two-input "or" circuit 54 and to the set input S of a "Ready" flip-flop 46.

The second input of the "or" circuit 54 is connected to the output of a first delay circuit 48. The output of the "or" circuit 54 is applied to a second delay circuit 56 whose output is applied to a three-input "and" gate 58. The output of the first delay circuit 48 is also applied to one input of a two-input "or" circuit 50 whose other input is a "Start" signal from the web drive mechanism (not shown). The output of the "or" circuit 50 is applied to the set terminal S of a "Hold" flip-flop 52 whose "one" output is a second input of the "and" gate 58. The third input of the "and" gate 58 is the "one" output of the "Ready" flip-flop 46.

The output of the "and" gate 58 is applied to a third delay circuit 60 whose output is applied to enable the partially enabled "and" gates 26′. The third delay circuit 60 also applies an input to a fourth delay circuit 62 whose output is connected to provide a reset signal to the individual flip-flops 24′ of the register 24, to the Character Present flip-flop 42, to the Ready flip-flop 46, and to the Hold flip-flop 52. The output of the fourth delay circuit 62 also provides a signal input to the first delay circuit 48.

In operation, the multiple bits 12 of an incoming character, detected at the reading heads 18, are transmitted on the lines making up the information cable 20. The incoming information signals set those one or more staticizer flip-flops 24′ corresponding to the information channels 14 in which the signals 12 representing "ones" are located. The first occurring signal which represents a "one" passes through the "or" circuit 22.

The first "one" signal is applied to set the Character Present flip-flop 42 whose "one" output triggers the one-shot 44. The pulse generated by the one-shot 44 sets the Ready flip-flop 46. The "one" output of the Ready flip-flop 46 then partially enables the "and" gate 58. The one-shot 44 output is also applied to the "or" circuit 54 and then passes through the second delay circuit 56 to further partially enable the "and" gate 58 momentarily, or to fully enable the "and" gate 58, depending upon the condition of the Hold flip-flop 52. Subsequent "one" signals of the same character at the "or" circuit 22 applied to the Character Present flip-flop 42 have no effect on the system.

The pulse output of the fourth delay circuit 62, generated by the preceding character, emerges from the first delay circuit 48, setting the Hold flip-flop 52 at a definite time interval after the arrival of the first signal of that preceding character. The output of the Hold flip-flop 52 partially enables the "and" gate 58. The output of the first delay 48 is also applied, by way of the "or" gate 54 and second delay 56, to the "and" gate 58 to partially enable momentarily, or to fully enable, the "and" gate 58, depending upon the condition of the Ready flip-flop 46.

If sufficient time has elapsed since the transfer of the previous character when the first "one" appears at the "or" gate 22, or, as in the case of the first of a series of characters, if the start signal has been applied to the "or" circuit 50, then the Hold flip-flop 52 is set prior to the setting of the Ready flip-flop 46, and the gate 58 is partially enabled by the output of the Hold flip-flop 52. The first "one" signal then sets the Ready flip-flop 46, further partially enabling the "and" gate 58. The first "one" signal also passes through the second delay 56 and fully enables the "and" gate 58, thus providing an input to the third delay 60.

Each of the signal pulses emerging from the "or" circuit 54 is delayed in the second delay circuit 56 to permit flip-flop stabilization and is then applied to the "and" gate 58. The later occurring of the two pulses fully enables the "and" gate 58 because the Ready flip-flop 46 and Hold flip-flop 52 are then "set," and a pulse is passed to the third delay circuit 60. The third delay circuit 60 provides a fixed time during which all of the character bits that are "ones" may be set up in respective staticizer flip-flops 24'.

The output of the third delay circuit 60 enables all of the partially enabled "and" gates 26' of Fig. 2 at one time, thus simultaneously gating the staticized "ones" into the information handling system on the multichannel cable 20'. The enabling pulse from the third delay circuit 60 of Fig. 3 is also applied to a fourth delay circuit 62 of Fig. 3 to provide a reset impulse to all flip-flops 24' of Fig. 1, imparting uniform pulse width to the information pulse combinations gated into the system. This reset signal is employed as the previous character pulse which is applied to reset the generator circuit flip-flops 42, 46, and 52, and to the first delay circuit 48.

In one embodiment, for example, a magnetic tape transport system carried the magnetic tape at a nominal linear speed of 80 inches per second. The characters were packed nominally 125 to the inch on the tape. Thus the signals arrived at a reading station at a nominal rate of 10,000 characters per second, which is equivalent to a 10 kilocycle average character rate and a 100 microsecond interval existing between successive leading edges of the first occurring "one" signal pulses.

The interval between the leading edge of a first "one" signal, and the trailing edge of the last "one" signal of any incoming character may extend over several microseconds. One information handling system which receives the character signals cannot accept characters at an interval between first "ones" of less than 80 microseconds.

When used with such a system the first delay circuit 48 introduces a delay of about 40 microseconds, the third delay circuit 60 introduces a delay of about 34 microseconds, and the fourth delay circuit 62 introduces a delay of about 5 microseconds. The second delay circuit 56 introduces a delay of two microseconds. These two microseconds afford time during which the Ready and Hold flip-flops 46, 52 become stabilized. The third delay circuit 60 is selected to correspond to the longest acceptable interval between the first "one" and the last "one" of an incoming character and to provide sufficient time to staticize any character whose time duration is within the acceptable interval.

In the embodiment shown, the staticizing time of 36 microseconds is the sum of the delays provided by the second delay circuit 56 and the third delay circuit 60. Any character having an interval of less than 36 microseconds between the first and last "one" signal can be staticized. Therefore, the first delay circuit 48 affords a delay which, when added to the value of the other delay circuits 56, 60 and 62, assures a spacing between adjacent characters which is the acceptable minimum interval for a particular system. The fourth delay circuit 62 is selected to provide uniform-width signal pulses of a desired duration corresponding to the delay introduced by this fourth delay circuit.

Incoming character signal pulses spaced apart by intervals of more than 81 microseconds are gated into the system with the 81 microsecond interval unchanged between successive characters. A character arriving before an 81 microsecond interval has elapsed after the arrival of the preceding character is delayed until the end of the 81 microsecond interval because of the action of the delays 60, 62, 48 and 56. Subsequent characters are delayed only if the time interval between arriving characters falls below the 81 microsecond minimum. Note that the minimum interval value of 81 microseconds is approximately at 20% deviation from the nominal character rate of 10 kilocycles which is equivalent to a spacing interval of 100 microseconds.

Figure 4:
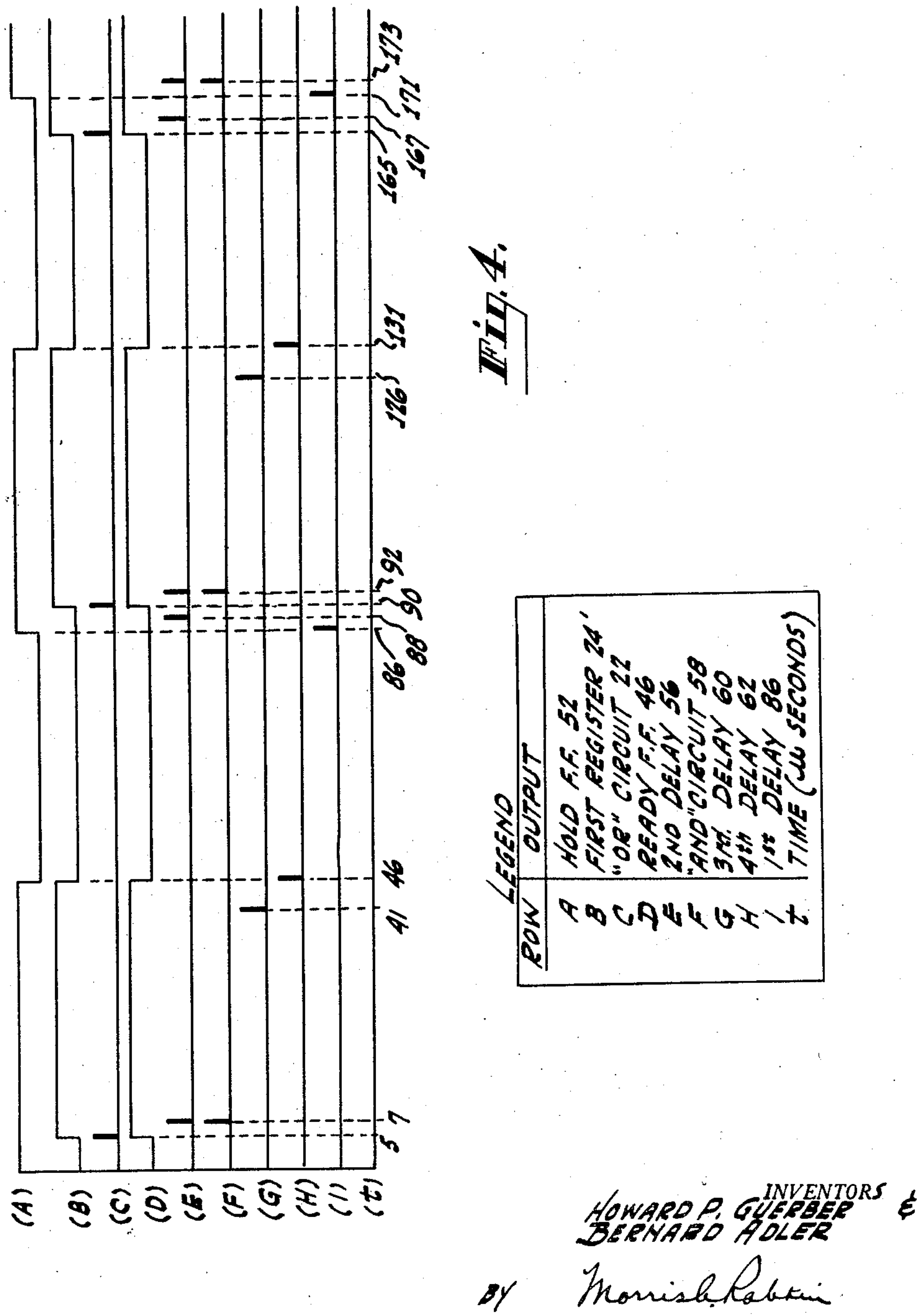
Figure 4 is a set of waveforms useful in explaining the operation of the gating pulse generator circuit of Figure 3.

The operation of the gating pulse generator circuit 40 may be better understood by way of a specific example, when considered together with the waveforms of Figure 4. For purposes of illustration, the useful outputs of the various "and" circuits, "or" circuits and delays are shown in Figure 4 as positive pulses; flip-flop outputs are illustrated as positive, or high, levels when the flip-flops are in the set state, and as low levels when the flip-flops are in the reset state.

Assume that the start input to the "or" circuit 50 is energized at a time, $t_0$. The output of the "or" circuit 50 sets the Hold flip-flop 52, whereby a high level output (row A, Figure 4) is provided at the output of the Hold flip-flop 52 at $t_0$ to partially enable the "and" gate 58. The first occurring bit of the first character is detected at the reading heads 18 five microseconds later, at time $t_5$. This first-occurring character bit sets the proper staticizer flip-flop 24' to provide a high level output (row B) therefrom, and enables the "or" circuit 22 to provide a positive going output pulse (row C). For clarity of drawing, only the output of the "or" circuit 22 in response to the first occurring bit of each character is illustrated in Figure 4.

The ready flip-flop 46 is set at $t_5$ by the output of the "one-shot" multivibrator 44. The output (row D) of the ready flip-flop is applied as another partially enabling input to the "and" gate 58. The "one-shot" multivibrator 44 output is also applied through the "or" circuit 54 to the second delay circuit 56, where a two microsecond delay is provided. The output (row E) of the second delay circuit 54 enables the "and" circuit 58 at time $t_7$. The "and" circuit 58 output (row F) is delayed thirty-four microseconds by the third delay circuit 60. An output (row G) from the third delay circuit 60 is provided at $t_{41}$, and is coupled to the "and" gates 26' and to the fourth delay circuit 62.

A five microsecond delay is provided by the fourth delay circuit 62, the output (row H) thereof being applied at $t_{46}$ to the first delay circuit 48 and to the reset terminals of the staticizer flip-flops 24', the Ready flip-flop 46, the Character Present flip-flop 42, and the Hold flip-flop 52. The first delay circuit 48 provides a 40 microsecond delay. The output (row I) of the first delay 48 sets the Hold flip-flop 52 at $t_{86}$ by way of "or" circuit 50, and is also applied to the second delay circuit 56 by way of "or" circuit 54.

Assume now that the first occurring bit of the second character is detected by the reading heads at $t_{90}$, eighty-five microseconds following the first occurring bit of the first character. The corresponding staticizer flip-flop 24' and the Ready flip-flop 46 are set at $t_{90}$. At $t_{92}$, the second delay circuit 56 provides an output which fully enables the "and" circuit 58. The "and" circuit 58 output is delayed for 34 microseconds by the third delay circuit 60 and, at $t_{126}$, the "and" circuits 26' in the staticizer are enabled. It is to be noted that eighty-five microseconds elapsed between the "and" circuit 26' enabling pulses for gating the first and second characters. This interval is greater than the 80 microsecond minimum interval required by the aforementioned information handling system. It is also to be noted that the eighty-five microsecond interval is exactly the time interval between the detection by the reading heads 18 of the first bits of the first and second characters.

An output is provided by the fourth delay circuit 62 at $t_{131}$. This output is applied to the input of the first delay circuit 48 and is also applied to the reset terminals of the staticizer flip-flops 24', the Ready flip-flop 46, the Character Present flip-flop 42, and the Hold flip-flop 52. The Hold flip-flop 52 is not set again until $t_{171}$ because of the forty microsecond delay provided by the first delay circuit 48. However, the first occurring bit of the third character is detected by the reading heads 18, and the Ready flip-flop is set at $t_{165}$, seventy-five microseconds following the detection of the first occurring bit of the second character. The output at $t_{167}$ of the second delay circuit 56 is ineffective to enable the "and" circuit 58 because the Hold flip-flop 52 is not set at this time.

An output is provided from the first delay circuit 48 at $t_{171}$. This output sets the Hold flip-flop 52 to provide a second partially enabling signal to the "and" gate 58. The first delay circuit 48 output is delayed two microseconds by the second delay circuit 56, and the output of the second delay circuit 56 fully enables the "and" circuit 58 at $t_{173}$. The third delay circuit 60 delays the output of the "and" circuit 56 for thirty-four microseconds, and provides an enabling signal to the "and" circuits 26' in the staticizer at $t_{207}$. The latter signal is not shown in Figure 4.

It is to be noted that eighty-one microseconds elapsed between the "and" circuit 26' enabling pulses for gating the second and third characters into the information handling system. This time interval is greater than the seventy-five microsecond time interval between detection by the reading heads 18 of the first occurring bits of the second and third characters. This time interval is also greater than the eighty microsecond interval required by the information handling system.

The width of the pulses illustrated in row C and in rows E through I of the Figure 4 is determined by the switching time of the "one-shot" multivibrator 44.

Given the average information rate and the maximum acceptable information rate for a particular system, values may be selected for the delay circuits according to the present invention to provide character signals of uniform duration and to prevent the pulse rate from increasing beyond a fixed maximum amount. The invention limits the time interval between successive character signals to an interval greater than a predetermined amount.

In the embodiment described, incoming characters whose signals may extend in time for an interval as great as 36 microseconds are staticized to provide the information handling system with a signal made up of simultaneous parallel signals of 5 microsecond duration.

It may be seen that other embodiments of the invention may work in a system wherein distinctive signals represent binary "zeros" and "ones." In such a system, the first arriving "bit" signal, whether "zero" or "one," is detected and applied to the gating pulse generating circuit. Known techniques are available to staticize the characters and gate them into the information handling system.

What is claimed is:

1. In a system for transmitting information represented by nominally simultaneously occurring code signals in parallel channels but wherein the simultaneity of said signals is subject to disturbance in point of time, the combination, with resettable static storage means adapted to be connected to said parallel channels and signal gating means connected to the output of said storage means, of gate pulsing means responsive to said parallel channel signals to apply a gating impulse to said signal gating means, said pulsing means comprising pulse gating means, a first conditioning means adapted to be connected to said parallel channels and being responsive to the earliest one of each group of said nominally simultaneous code signals to precondition said pulse gating means, second conditioning means including a delay means responsive to the outputs of the gating impulse last generated to precondition said pulse gating means, said pulse gating means providing the said gating impulse when enabled by the outputs of both of said conditioning means, and time delaying means connected to said pulse gating means to delay said gating impulse to provide a resetting impulse and further connected to provide the input to said second conditioning means.

2. In a system for transmitting information characters represented by nominally simultaneously occurring code signals in parallel channels but wherein the simultaneity of said signals is subject to disturbance in point of time, the combination with a plurality of resettable storage means each having a set output and each adapted to be set by a signal in a separate one of said parallel channels, and a plurality of signal gating means each connected to the set output of a separate one of said storage means and conditioned by the set state of said connected storage means, of pulse generating means connected to receive said parallel channel signals and connected to apply a simultaneous gating impulse to said conditioned signal gating means and a resetting impulse to said storage means, said generating means comprising first conditioning means adapted to be connected to said parallel channels for response to a first signal in each of said signal groups, second conditioning means including first delaying means connected to said generating means output for response to the gating impulse last generated, pulse gating means connected to said first and second conditioning means to provide said gating impulse in response to the combined output of both of said conditioning means, second delaying means connected to said pulse gating means to delay said gating impulse for a predetermined signal group interval, and third delaying means connected to said second delaying means to further delay said gating impulse to provide said resetting impulse to said storage means and a pulse input to said first delaying means.

3. In a system for transmitting information represented by nominally simultaneously occurring signals in parallel channels but wherein the simultaneity of said signals is subject to disturbance in point of time, the combination comprising a plurality of storage means each adapted to be connected to a separate one of said parallel channels, a plurality of gating means each connected to the output of a separate one of said storage means, and pulse generating means adapted to be connected to receive said parallel channel signals, said generating means being responsive to said signals to apply gating impulses simultaneously to said gating means, said generating means including means to provide pulses as said gating impulses, a first conditioning means and a second conditioning means connected to condition said pulse providing means, said first conditioning means being responsive to the first occurring signal of said nominally simultaneously occurring signal group, said second conditioning means being responsive to the output of said generating means representing a gating impulse generated by the preceding information signal group and delayed by a specified minimum signal group interval, said pulse providing means being adapted to emit each said gating impulse when fully conditioned by said first and second conditioning means, a delaying means connected to said pulse providing means to delay said gating impulses for a specified interval to permit all of said nominally simultaneously occurring signals to appear at said storage means before applying each said gating impulse to said gating means, and another delaying means connected to receive said delayed gating impulse to further delay said gating impulse before applying said gating impulse to said second conditioning means.

4. In a system for transmitting information represented as the nominally simultaneously occurring combination of signals in parallel channels but wherein the simultaneity of said signals is subject to disturbance in point of time said system having a plurality of flip-flops each connected to respond to a signal appearing on a separate one of said parallel channels, and a plurality of signal gating means each connected to the output of a separate one of said flip-flops, the improvement comprising an enabling pulse source adapted to receive said signals from said parallel channels to apply an enabling pulse simultaneously to all of said signal gating means and a resetting pulse to the said flip-flops, said enabling pulse source comprising a first conditioning means adapted to be connected to said parallel channels and being responsive to the first appearing signal of a current signal combination, a second conditioning means responsive to the enabling pulse last provided, a pulse gating means connected to be conditioned by said first and second conditioning means, said conditioned pulse gating means being adapted to provide said enabling pulses, a first delaying means to delay said enabling pulses before applying said enabling pulses to said signal gating means, second delaying means connected to said first delaying means to provide resetting impulses to said flip-flops, and a third delaying means connected to said second delaying means to provide a pulse input to said second conditioning means.

5. In a system adapted to receive and store information characters represented as the binary combination of nominally simultaneously occurring signals in a plurality of signal channels but wherein the simultaneity of said signals is subject to disturbance in point of time, means to gate each of said characters into an information handling system comprising a plurality of signal gates each adapted to be connected to a separate one of said channels, each gate being conditioned by a character signal in said channel, and generating means connected to apply gating pulses to said conditioned signal gates for applying signal combinations to said information handling system, said generating means including a first signal source responsive to a first arriving signal from each of said nominally simultaneously occurring binary signal combinations, first conditioning means connected to be responsive to signals from said first signal source, second conditioning means connected to said generating means output and responsive to the last produced gating pulse delayed by an amount equivalent to a predetermined character spacing interval, pulse gate means connected to provide an output after actuation by both said first and second conditioning means, and time delaying means connected to said pulse gate means for applying, in chronological sequence, gate enabling pulses to said signal gates, resetting impulses to said conditioning means, and said delayed last produced gating pulses to said second conditioning means.

6. In combination, a set of registers each having a set and reset state, a first signal source for providing signals to selectively set said registers, a set of signal gates each responsive to a corresponding one of said registers in its set state, and a second signal source connected to said first signal source including grst and second enabling means, said first enabling means being responsive to said first signal source setting signals, said second enabling means being responsive to signals derived from earlier second signal source signals, said second signal source being adapted to provide output when enabled by both said first and second enabling means, a first delaying means connected to said second signal source to provide a limited time interval for the setting of said registers, said first delaying means being connected to apply a simultaneous enabling impulse to all of said signal gates, a second delaying means connected to said first delaying means to apply a simultaneous impulse to reset all of said registers, and a third delaying means connected to said second delaying means to apply a said derived signal to said second enabling means concurrently with the next signal output of the said first signal source.

7. A signal generator for providing gating signals in response to a group of input signals, said input signals constituting a group occurring nominally simultaneously but wherein the simultaneity of said signals is subject to disturbance in point of time and any group occurring after the preceding group by a nominally certain time, said generator comprising means to detect the first signal of each said group, a gate having a first, a second, and a third input and an output, said first input being connected to receive the output of said detecting means, a first delay circuit having an output connected to provide a signal to said gate second input, a second delay circuit connected to receive the output of said detecting means and said first delay circuit, said second delay circuit providing a delayed signal to said gate third input, and a third delay circuit connected to said gate output to provide said gating signals, the input of said first delay circuit being connected to receive the output of said third delay circuit, said first delay circuit delaying said gating signal by a time interval equivalent to said nominally certain time.

8. A gating pulse generator for providing pulses in response to a group of signals, said signals constituting a group occurring nominally simultaneously but wherein the simultaneity of said signals is subject to disturbance in point of time and any group occurring after the preceding group by a nominally certain time, said generator comprising a gate having three inputs, a first flip-flop having setting and resetting inputs and a set output, said set ouptput being connected to one of said gate inputs, a signal detecting means for generating a pulse in response to the first of a said group of singals, said first flip-flop set input being connected to the pulse output of said detecting means, a second flip-flop having setting and resetting inputs and a set output, said second flip-flop set output being connected to provide another said input to said gate, an "or" circuit having two inputs, one of said "or" circuit inputs being connected to said detecting means output and the other of said "or" circuit inputs being connected to receive said second flip-flop setting input, said "or" circuit being connected to the third of said gate inputs, first delay means connected to said gate output to provide a gating impulse, second delay means connected to said first delay means for providing resetting inputs to said flip-flops, and third delay means connected to said second delay means for providing signals to said second flip-flop setting input and to said "or" circuit.

References Cited in the file of this patent

UNITED STATES PATENTS

| | | |
|---|---|---|
| 2,549,071 | Dusek | Apr. 17, 1951 |
| 2,700,155 | Clayden | Jan. 18, 1955 |
| 2,793,344 | Reynolds | May 21, 1957 |

UNITED STATES PATENT OFFICE

CERTIFICATE OF CORRECTION

Patent No. 2,948,884 August 9, 1960

Howard P. Guerber et al.

It is hereby certified that error appears in the printed specification of the above numbered patent requiring correction and that the said Letters Patent should read as corrected below.

Column 9, line 40, after "output" insert -- pulse --; line 52, for "grst" read -- first --; column 10, line 37, for "ouptput" read -- output --; line 39, for "singals" read -- signals --.

Signed and sealed this 4th day of April 1961.

(SEAL)
Attest: ERNEST W. SWIDER

XXXXXXXXXXXX
Attesting Officer

ARTHUR W. CROCKER
Acting Commissioner of Patents